United States Patent [19]

Martenas

[11] 4,290,255
[45] Sep. 22, 1981

[54] FEED ROLL APPARATUS

[75] Inventor: Wayne B. Martenas, New Holland, Pa.

[73] Assignee: Sperry Corporation, New Holland, Pa.

[21] Appl. No.: 192,784

[22] Filed: Oct. 1, 1980

[51] Int. Cl.³ ............................................. A01D 41/12
[52] U.S. Cl. ..................................... 56/10.2; 29/123
[58] Field of Search .................. 56/10.2, DIG. 15; 29/123, 124; 172/539, 537, 552, 536

[56] References Cited

U.S. PATENT DOCUMENTS

| | | | |
|---|---|---|---|
| 889,090 | 5/1908 | Bandle | 172/552 |
| 2,329,469 | 9/1943 | Huck | 29/123 |
| 2,528,116 | 10/1950 | Clemson | 29/123 |
| 2,542,287 | 2/1951 | Neubauer | 29/123 |
| 3,959,953 | 6/1976 | Garrott | 56/10.2 |
| 3,972,156 | 8/1976 | Bennett, Jr. et al. | 56/10.2 |
| 4,193,248 | 3/1980 | Gilleman | 56/10.2 |

Primary Examiner—Paul J. Hirsch
Attorney, Agent, or Firm—James R. Bell; Frank A. Seemar

[57] ABSTRACT

A feed roll on a forage harvester has a center support ring secured to the outer surface of the feed roll. This improves space availability inside the roll for a metal detector and improves the operating effectiveness of the metal detector.

5 Claims, 3 Drawing Figures

FEED ROLL APPARATUS

BACKGROUND OF THE INVENTION

This invention relates generally to harvesters and more particularly to those having condition responsive operation.

Conventional feed rolls having a metal detecting unit mounted inside, also had a strengthening member such as a circular support ring secured to the inner peripheral surface of the feed roll. The ring limited space availability for the metal detecting unit within the feed roll. Also, the metal detecting unit was formed in two separate halves and had to be installed in such a way that a large gap existed between the halves for accommodating the support ring. The gap caused a weakness in metal detecting sensitivity in the area surrounding the center of the periphery of the feed roll.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing feed roll apparatus including spaced apart end plates interconnected by a tubular peripheral wall. The wall has an outer surface. Means are secured to the outer surface, substantially midway between the end plates, for strengthening the wall.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
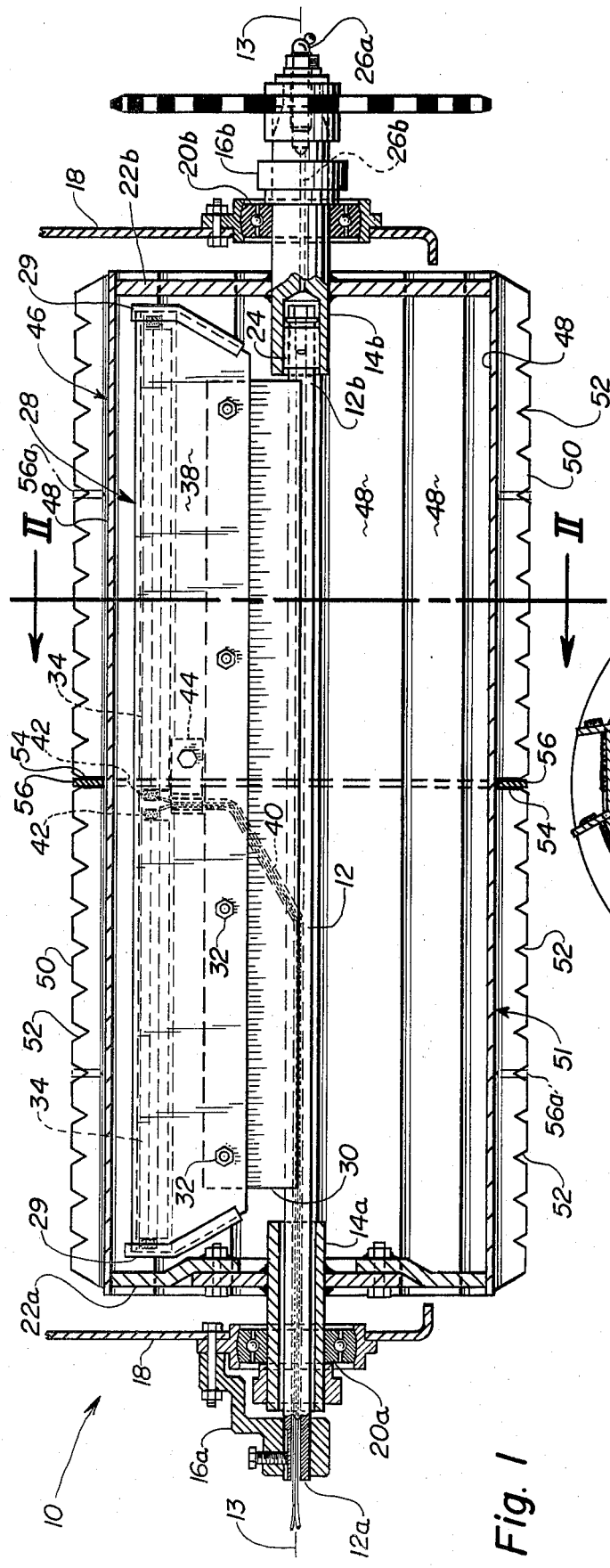
FIG. 1 is a vertical cross-sectional view illustrating the apparatus of this invention.
Figure 2:
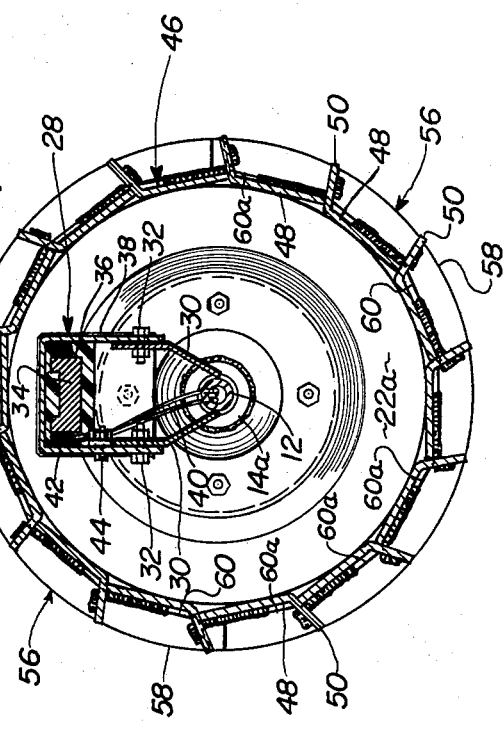
FIG. 2 is a view taken along lines II—II of FIG. 1.

FIGS. 1 and 2 illustrate a feed roll generally designated 10 and including a steel shaft 12. One end 12a of shaft 12 extends along an axis 13 and also extends freely through a steel collar 14a and is secured in a cast iron mount 16a secured to a steel frame portion 18 of an agricultural machine such as a forage harvester. A commercially available bearing 20a is secured to frame portion 18 and rotatably supports collar 14a connected to rotate with a steel end plate 22a of feed roll 10 relative to shaft 12.

Another end 12b of shaft 12 is mounted in a steel collar 14b via a bushing 24. Collar 14b is secured at the rotatably driven end 12b of shaft 12. A bearing 20b is secured to frame portion 18 and supports collar 14b connected to rotate with another steel end plate 22b of feed roll 10 relative to shaft 12. A lubricating fitting 26a and passage 26b permit lubrication of bushing 24.

A known metal detecting unit 28, shielded at 29, is fixedly secured to shaft 12 for remaining stationary during rotation of feed roll 10. A pair of steel plates 30 are fixedly secured by welding to shaft 12. Bolts 32 support metal detecting unit 28 on plages 30. Briefly, metal detecting unit 28 comprises a pair of field generating elements 34 enveloped in a mass of epoxy 36 within an aluminum housing 38. An electrical connection 40 extends from coil 42 in each of the elements 34 and outwardly through shaft 12 to other electrical components (not shown) in the associated vehicle. A clamp 44 secures connection 40 within housing 38.

A tubular peripheral wall 46 is preferably formed of a plurality of stainless steel slats 48 having corrugations 50 formed on outer surface 51 thereof. Slats 48 are welded at opposite ends for interconnecting end plates 22a, 22b. Corrugations 50 are elongated and extend substantially coaxially with shaft 12 and protrude substantially radially outward from feed roll 10. Corrugations 50 each include a plurality of notches 52. Also corrugations 50 each include a groove 54 substantially midway between end plates 22a, 22b. The slats 48 are aligned so that grooves 54 form a circumferential groove directed radially inward in the elongated corrugations, transverse to the shaft axis 13.

Figure 3:
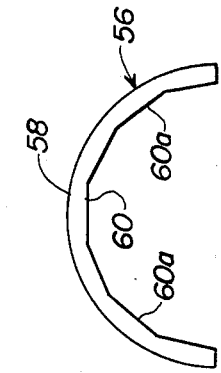
FIG. 3 is a view of a semi-circular portion of the strengthening ring.

Means such as a ring 56, FIGS. 2 and 3, or a plurality of rings 56a is provided for strengthening tubular wall 46. Ring 56 is preferably formed of two stainless steel semi-circular sections one of which is best illustrated in FIG. 3 having an arcuate outer surface 58 and an inner surface 60 having a plurality of flat surfaces 60a for accommodating slats 48. The sections preferably are stainless welded into groove 54.

With the parts assembled as set forth above, end plates 22a, 22b, wall 26 and ring 56, rotate freely about stationary shaft 12 and metal detecting unit 28. Ring 56 strengthens wall 46 substantially at a point midway between end plates 22a, 22b.

The foregoing has described an external circumferential support ring for strengthening the peripheral tubular wall of a feed roll.

It is anticipated that aspects of the present invention, other than those specifically defined in the appended claims, can be obtained from the foregoing description and the drawings.

Having thus described the invention, what is claimed is:

1. A feed roll apparatus comprising:
   a shaft;
   a feed roll rotatably mounted on said shaft; said feed roll having spaced apart end plates interconnected by a tubular peripheral wall;
   a plurality of elongated corrugations formed on an outer surface of said wall, said corrugations extending substantially coaxially with said shaft and protruding substantially radially outwardly from said feed roll, said corrugations having a circumferential groove formed therein substantially midway between said end plates, said groove being directed radially inward transverse to said shaft axis; and
   means for strengthening said tubular wall, said means being a support ring secured in said groove and extending radially outwardly from said wall surface and terminating adjacent said corrugations.

2. The feed roll apparatus of claim 1 wherein said support ring includes two semi-circular sections secured to said groove.

3. The feed roll apparatus of claim 1 including:
   a metal detector supported by said shaft within said tubular peripheral wall.

4. The feed roll apparatus of claim 3 wherein said metal detector is fixedly attached to said shaft.

5. The feed roll apparatus of claim 3 wherein said shaft is secured to a frame portion of a harvesting machine.

* * * * *